United States Patent [19]

Miyake et al.

[11] Patent Number: 4,812,358
[45] Date of Patent: Mar. 14, 1989

[54] MAGNETIC RECORDING MEDIUM

[75] Inventors: Toru Miyake; Yasushi Nakano, both of Hino, Japan

[73] Assignee: Konishiroku Photo Industry Co., Japan

[21] Appl. No.: 88,066

[22] Filed: Aug. 21, 1987

[30] Foreign Application Priority Data

Aug. 25, 1986 [JP] Japan .................................. 61-199678

[51] Int. Cl.$^4$ .............................................. G11B 5/70
[52] U.S. Cl. .................................... 428/323; 428/408; 428/694; 428/900
[58] Field of Search ................ 428/323, 408, 694, 900

[56] References Cited

U.S. PATENT DOCUMENTS

| | | | |
|---|---|---|---|
| 4,546,038 | 10/1985 | Yamaguchi et al. | 428/694 |
| 4,614,685 | 9/1986 | Ryoke et al. | 428/694 |
| 4,647,503 | 3/1987 | Yamaguchi et al. | 428/323 |
| 4,654,258 | 3/1987 | Kawamata et al. | 428/694 |

Primary Examiner—Paul J. Thibodeau
Attorney, Agent, or Firm—Bierman, Muserlian

[57] ABSTRACT

A magnetic recording medium is described which comprises a magnetic layer containing a magnetic powder, a first carbon black having a BET specific surface value of 80 m$^2$/g to 900 m$^2$/g and a DBP oil absorption value of less than 110 ml/100 g. The second carbon black is present in an amount of 3 to 15 parts by weight per 100 parts by weight of magnetic powder.

11 Claims, 4 Drawing Sheets

MAGNETIC RECORDING MEDIUM

FIELD OF THE INVENTION

The present invention relates to a magnetic recording medium such as a magnetic tape, a magnetic sheet, a magnetic disc or the like.

BACKGROUND OF THE INVENTION

Generally, a magnetic recording medium such as a magnetic tape is produced by coating and drying a magnetic coating liquid comprising a magnetic powdery material, binder resin, and the like on a support.

In such a magnetic recording medium, particularly in video tape, carbon black is used in combination with the above materials in order to satisfy simultaneously some of the properties such as the conductivity, coefficient of friction, surface nature (i.e., electromagnetic conversion property), wear resistance, and the like. As the technique of this kind there are known those conventional techniques disclosed in, Japanese Patent Publication Open to Public Inspection (hereinafter referred to as Japanese Patent O.P.I. Publication) Nos. 5426/1984, 1614/1984, 218039/1983 and 211321/1983, and Japanese Patent Examined Publication Nos. 20203/1978, 9041/1979 and 4968/1982.

These techniques, however, were inadequate to provide a recording medium having an excellent conductivity and a low coefficient of friction, i.e., being excellent in the runnability as well as in the wear resistance, without roughening the surface, i.e., without deteriorating the electromagnetic conversion property.

Namely, in the above-mentioned techniques, where carbon black whose particle sizes are not more than 30 m$\mu$ were used, the conductivity is not always improved. For example, carbon black with a particle size of 23 m$\mu$, when used along, must be incorporated into the magnetic layer in a quantity of not less than 15 parts by weight to 100 parts by weight of a magnetic powdery material to make the surface resistivity lower than $10^{10}\Omega$/sq. However, if such a large amount of carbon is added, the electromagnetic conversion property is lowered. Also, in the carbon black whose particle sizes are not more than 40 m$\mu$, the friction on the magnetic layer's surface increases. If, in order to reduce the friction, a large amount of a lubricant is added, then there occur such phenomena as the deterioration of the electromagnetic conversion property, bleed-out phenomenon, etc. Where a large amount of carbon black whose particle sizes are not less than 50 m$\mu$ is used, the electromagnetic conversion property is lowered. Also, the carbon black whose particle sizes are not less than 50 m$\mu$ do not always improve the electromagnetic conversion property but rather generally lower the electromagnetic conversion property as in the case of carbon black having particle sizes of not more than 30 m$\mu$ and a BET value of not less than 500 m$^2$/g or carbon black having particle sizes of not less than 40 m$\mu$.

SUMMARY OF THE INVENTION

It is an object of the present invention to provide a magnetic recording medium which is improved in the running durability as well as in the conductivity without deteriorating the electromagnetic conversion property.

The above object of the present invention is accomplished by a magnetic recording medium comprising a magnetic layer containing a first carbon black whose specific surface is in terms of a BET value of from 80 m$^2$/g to 900 m$^2$/g and whose oil absorption is in terms of a DBP value of not less than 110 ml/100 g, and preferably not more than 200 ml/g, and a second carbon black whose specific surface is in terms of a BET value of not less than 50 m$^2$/g, and preferably less than 900 m$^2$/g, and whose oil absorption is in terms of a DBP value of less than 110 ml/100 g.

BRIEF DESCRIPTION OF THE DRAWINGS

The drawings show examples of the present invention.

DETAILED DESCRIPTION OF THE INVENTION

Figure 1:
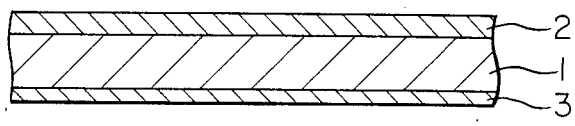
FIG. 1, FIG. 2 and FIG. 3 are partially enlarged sectional views of the respective examples.

It has now been found that, according to this invention, the aforementioned shortcomings of the conventional techniques can be adequately dissolved because the first carbon black and second carbon black having BET values and oil absorptions in their respective specific ranges are used in combination. That is, both first and second carbon blacks, since their BET values are as relatively large as not less than 80 m$^2$/g and 50 m$^2$/g, respectively, and less than 900 m$^2$/g, tend to show high-density recording and high-electromagnetic conversion properties, and also, due to their oil absorptions, show not only their dispersibilities being maintained satisfactory but their friction coefficients reduced and also light-tightness improved. Furthermore, as regards the improvement on the conductivity, the first carbon black, since it shows an oil absorption of not less than 110 ml/100 g, easily takes a relatively structural construction to show a high conductivity and to lower friction.

In addition, in the above, the BET value of the first carbon black should preferably be from 80 m$^2$/g to 400 m$^2$/g, and more preferably from 80 m$^2$/g to 200 m$^2$/g. And the oil absorption of the first carbon black should be substantially not more than 200 ml/100 g, and more preferably from 110 to 160 ml/100 g. Increasing the amount of the second carbon black does not deteriorate the surface nature nor lower the electromagnetic conversion property. In the second carbon black, the desirable range of its BET value is preferably 50m$^2$/g to 400m$^2$/g, more preferably 50m$^2$/g to 400m$^2$/g.

In this invention, in order to obtain the above effect, the amount of carbon black, as the total amount of both first and second carbon blacks, is preferably 3 to 20 parts by weight to 100 parts by weight of a magnetic powdery material, and more preferably from 3 to 15 parts by weight. There is a desirable range also in the proportion of both carbon blacks: The first carbon black should be used in an amount of preferably 0.1–10 parts by weight, more preferably 0.1–5 parts by weight, to 100 parts by weight of a magnetic powdery material, and the second carbon black should be in an amount of 3–15 parts by weight, more preferably 5–12 parts by weight).

Useful examples of the first carbon black in this invention include Raven 3200 and Raven 825 manufactured by Columbian Carbon; Vulcan-P, Vulcan-9 and Black Pearls-700 by Cabot; #40, #30 and MA-600 by Mitsubishi Chemical Industries and the like. Useful examples of the second carbon black include Raven 1035, Raven 1255, Raven 1000 and Raven 2000 manufactured by Columbian Carbon; Black Pearls-L, Black Pearls 1000, Black Pearls 900 and Monarck-800 by Cabot; CF-9 by Mitsubishi Chemical Industries; and the like.

In addition, the terms 'specific surface' in above means the surface area per unit weight and is a physical quantity quite different from the average particle size; for example, there exist particles identical in the average particle size but differing in the specific surface; i.e., those having a large specific surface and those having a small specific surface. Measurement of the specific surface can be carried out by, e.g., a measuring method generally called the B.E.T. method, in which a magnetic powdery material is first deaerated being heated to around 250° C. for 30 to 60 minutes to thereby remove adsorbates therefrom, and then is conducted into the measuring instrument, wherein its inside initial pressure of a nitrogen gas is settled to 0.5 kg/m$^2$, whereby adsorption measurement is made with nitrogen at a liquid nitrogen temperature of $-195°$ C. For more detail, reference can be made to J. Ame. Chem. Soc., 60 309 (1938). As the measuring instrument for the specific surface (BET value), a powder measuring instrument called 'Quantasorb' manufactured jointly by Yuasa Battery Co. and Yuasa Ionics Co. can be used. General explanations about the specific surface and measuring methods therefor are described in detail in the 'Measurement of Powder' (by J. M Dallavalle and Clydeorr Jr.) (translated into Japanese 'Funtai no Sokutei' by Benda et al; published by Sangyo Tosho Publishing Co.), and also in the 'Kagaku Benran (Handbook of Chemistry)' (Applied Chemistry Sec., p. 1170–1171, edited by the Japan Chemical Society, published on Apr. 20th, 1966 from Maruzen Co., Ltd.). (In the above 'Kagaku Benran', the specific surface (Hihyomenseki) is merely called 'Hyomenseki' (surface area), but this is quite the same in meaning as in terms 'specific surface' in this specification.)

As regards the foregoing 'oil absorption (DBP method)', DBP (Dibutyl phthalate) is added little by little to 100 g of a pigment powder, and they are kneaded and in the meantime the state of the pigment is observed, and the ml value of the DBP obtained when finding a point at which the pigment is turned into the agglomerated state from the dispersed state is defined as the DBP oil absorption.

The magnetic recording medium of this invention, as shown, for example, in FIG. 1, has a magnetic layer 2 on its support 1, and also has a BC layer 3 on the reverse side of the support to the magnetic layer 1. This BC layer may or may not be provided. Examples of the magnetic powder, particularly ferromagnetic powder, to be used in magnetic layer 2 include magnetic powdery materials such as $\gamma$-Fe$_2$O$_3$, Co-containing $\gamma$-Fe$_2$O$_3$, Fe$_3$O$_4$, CO-containing Fe$_3$O$_4$, and the like. Of these, the preferred ones are the Co-containing iron oxides. Remarkable effects of such magnetic powdery materials can be obtained where the BET value thereof is not less than 35 m$^2$/g, and more preferably not less than 40 m$^2$/g. The magnetic layer 2 may contain a lubricant (such as silicone oil, graphite, molybdenum disulfide, tungsten disulfide, or one of fatty acid esters formed from monobasic fatty acids having 12 to 20 carbon atoms (such as stearic acid) and monohydric alcohols having 3 to 26 carbon atoms), an antistatic agent (such as graphite), and the like, in addition to the foregoing first and second carbon blacks. The magnetic layer may also contain a nonmagnetic abrasive particulate material. In that case, alumina (such as $\alpha$-Al$_2$O$_3$ (corundum), etc.), artificial corundum, fused alumina, silicon carbide, chromium oxide, diamond, artificial diamond, garnet, emery (principal components: corundum and magnetite), or the like may be used. The abrasive material content of the magnetic layer is desirable to be not more than 20 parts by weight to the magnetic powder, and the abrasive material's average particle size is preferably 0.5 $\mu$m, and more preferably not more than 0.4 $\mu$m.

As the binder resin for the magnetic layer, at least a polyurethane may be used, which may be synthesized by the reaction of a polyol with a polyisocyanate. In addition to the polyurethane, if a phenoxy resin and/or a vinyl chloride-type copolymer also are to be contained, the binder resin, when applied to the magnetic layer, can improved the dispersibility of the magnetic powder to thereby increase the mechanical strength thereof. The use of the phenoxy resin and/or vinyl chloride-type copolymer alone hardens the layer to excess, but this can be prevented by incorporating the polyurethane, and further the incorporation of the polyurethane improves the adherence of the layer to the support or to the subbing layer. In place of the above resins, cellulose-type resins, thermoplastic resins, thermosetting resins, reaction-type resins or electron radiation setting-type resins may also be used as the binder resin.

The foregoing carbon black used in the magnetic layer 2 of this invention may be added also to the BC layer 3.

The recording medium of FIG. 1 may be one having a subbing layer (not shown) provided between magnetic layer 2 and support 1, or one having no subbing layer (the same shall apply hereinafter), or one having the support subjected to corona discharge treatment.

As the material for support 1, a plastic such as polyethylene terephthalate or polypropylene; a metal such as Al, Zn, etc.; glass plates, BN, Silicon carbide; ceramics such as porcelain, earthenware, etc; or the like, may be used.

At the time of coating and forming the above magnetic layer or other layer, in advance adding a polyfunctional isocyanate as a cross-linking agent in a specified quantity to the coating liquid is desirable in respect of enabling to strengthening the magnetic layer. Useful examples of such the cross-linking agent include triphenylmethane triisocyanate, tris-(p-isocyanate-phenyl)-thiophosphite, polymethylene-polyphenyl isocyanate, and the like, in addition to the above-mentioned polyfunctional polyisocyanates. And also methylene diisocyanate-type and tolylene diisocyanate-type cross-linking agents are also useful. When the magnetic layer is hardened by electron beam radiation or the like, the addition of the isocyanate compound may be made or may be omitted.

Figure 2:
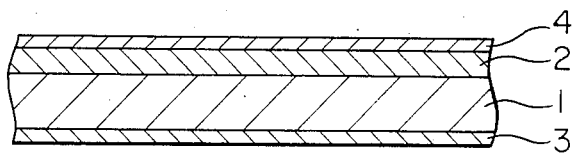

FIG. 2 shows another example of the magnetic recording medium, wherein a OC layer 4 is provided on the magnetic layer 2 of the medium of FIG. 1. This OC layer 4 is provided for the purpose of protecting the magnetic layer 2 from being damaged, so that it needs to have a sufficient slidability. Upon this, the polyurethane resin (preferably phenoxy resin and/or vinyl chloride-type copolymer in combination) that is used in the above magnetic layer 2 is to be used as the binder resin of the OC layer 4. The surface roughness of OC layer 4, particularly in connection with the chroma S/N, should be set as Ra≦0.01 μm, and Rmax≦0.13 μm. In this instance, the surface roughness of the support 1 is desirable to be as smooth as Ra≦0.01 μm and Rmax≦0.13 μm.

Figure 3:
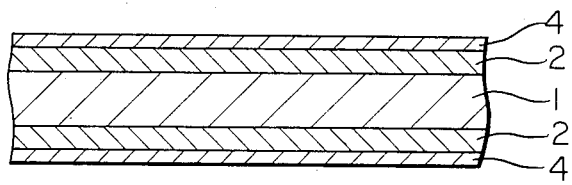

FIG. 3 shows a magnetic recording medium that is constructed as a magnetic disc, wherein the support 1 has on each of both sides thereof the magnetic layer 2 and OC layer 4 similar to the above, and the OC layer 4 is allowed to contain a binder resin comprised principally of the foregoing polyurethane resin.

EXAMPLES

The present invention will be illustrated in detail by the following examples. The term 'part(s)' used hereinafter represents 'part(s) by weight'.

Each of the magnetic powder-dispersed coating liquids obtained by dispersing by means of a ball mill the constituents given in the respective compositions in Examples 1 through 11 and Comparative Examples 1 through 4, after the addition of a polyisocyanate thereto, was coated on one side of a 15 μm-thick polyethylene terephthalate base by means of an extrusion coater, then dried, and then the coated product was subjected to calender-surface treatment. After that, it was slitted into ½-inch-wide tape rolls. The average thickness of the magnetic layer at this time was 4.0μ.

Each of the obtained tape samples was measured with respect to the following items. Consequently, the results as shown in Table 2 were obtained.

RF output: A VTR deck for RF output measurement was used to measure the RF output at 4 MHz. The output (in dB) obtained after 100-time-repeated video tape reproducing operations is shown in a relative value to that of Example 9 (0 dB) as reference to Table 2.

Lumi S/N: A noise meter (925 S/1) manufactured by Shibasoku K.K. was used to measure the lumi S/N. The obtained values each is shown in terms of the difference from that of Example 1 as reference tape (0 dB). The measurement was made with the high-pass filter being set to 4.2 MHz and the low-pass filter being set to 10 kHz. The VTR used was a JVC HR-D120.

Chroma S/N: The measurement was made in similar manner to the RF output.

Coefficient of Friction: The tape tensions at both the inlet and the outlet of the heat cylinder were measured to find $$\mu = \frac{1}{\pi} \ln \frac{T_2 \text{ (outlet-side tension)}}{T_1 \text{ (inlet-side tension)}}.$$

Surface resistivity: Measurement was made by using a surface potentiometer.

Drop-out: Number of scratch defects that appeared on the reproduced image.

Runnability test: Tape samples were continuously run through a video deck over a period of 200 hours at a temperature of 40° C. with a relative humidity of 80% to measure degrees of the deterioration of the RF output, skew, and shedding of each sample. The runnability tests shown in Table 2. NG means at least on of the following evaluations 1. the deterioration of the RF output is less than −2 dB,
2. the skew is not less than 15 μsec. and
3. the shedding is seriously found.

TABLE 1

| | Example 1 | Example 2 | Example 3 | Example 4 |
|---|---|---|---|---|
| Co-containing magnetic iron oxide | 100 parts | 100 parts | 100 parts | 100 parts |
| Vinyl chloride-vinyl acetate copolymer (VAGH of U.C.C. Co.) | 13 parts | 13 parts | 13 parts | 13 parts |
| Polyurethane (Esthane 5701 produced by Goodrich Co.) | 7 parts | 7 parts | 7 parts | 7 parts |
| Alumina powder | 5 parts | 5 parts | 5 parts | 5 parts |
| Myristic acid | 1 part | 1 part | 1 part | 1 part |
| Butyl stearate | 1 part | 1 part | 1 part | 1 part |
| Carbon black | 9 parts CF-9 (Mitsubishi Kasei) (BET 60 m²/g, oil absorption 65 ml/100 g) 1 part Vulcan-P (Cabot) (BET 140 m²/g, oil absorption 118 ml/100 g) | 9 parts Raven-1035 (Columbian Carbon)(Bet 95 m²/g, oil absorption 56 ml/100 g) 1 part Vulcan-9 (Cabot) (BET 140 m²/g, oil absorption 114 ml/100 g) | 6 parts Black Pearls-1000 (Cabot)(BET 343 m²/g, oil absorption 104 ml/100 g) 4 parts Vulcan-P (Cabot) (BET 143 m²/g, oil absorption 118 ml/100 g) | 5 parts Raven-1255 (Columbian Carbon)(BET 125 m²/g, oil absorption 56 ml/100 g) 5 parts Raven-3200 (Columbian Carbon)(BET 325 m²/g, oil absorption 125 ml/100 g) |
| Polyisocyanate | 13 parts | 13 parts | 13 parts | 13 parts |
| Cyclohexanone | 130 parts | 130 parts | 130 parts | 130 parts |
| Toluene | 70 parts | 70 parts | 70 parts | 70 parts |
| Lecithin | 3 parts | 3 parts | 3 parts | 3 parts |

| | Example 5 | Example 6 | Example 7 | Example 8 |
|---|---|---|---|---|
| Co-containing magnetic iron oxide | 100 parts | 100 parts | 100 parts | 100 parts |
| Vinyl chloride-vinyl acetate copolymer (VAGH of U.C.C. Co.) | 13 parts | 13 parts | 13 parts | 13 parts |
| Polyurethane (Esthane 5701 produced by Goodrich Co.) | 7 parts | 7 parts | 7 parts | 7 parts |
| Alumina powder | 5 parts | 5 parts | 5 parts | 5 parts |
| Myristic acid | 1 part | 1 part | 1 part | 1 part |
| Butyl stearate | 1 part | 1 part | 1 part | 1 part |
| Carbon black | 7 parts Raven-1255 (Columbian Carbon)(BET 125 m²/g, oil absorption 56 ml/100 g) 3 parts Vulcan-9 (Cabot) (BET 140 m²/g, oil absorption 114 ml/100 g) | 7 parts Black Pearls-L (Cabot) (BET 138 m²/g, oil absorption 55 ml/100 g) 3 parts Vulcan-9 (Cabot) (BET 140 m²/g, oil absorption 114 ml/100 g) | 7 parts Black Pearls-1000 (BET 138 m²/g, oil absorption 55 ml/100 g) 3 parts Vulcan-P (BET 140 m²/g, oil absorption 114 ml/100 g) | 12 parts Black Pearls-1000 (BET 138 m²/g, oil absorption 55 ml/100 g) 3 part Vulcan-P (BET 140 m²/g, oil absorption 114 ml/100 g) |
| Polyisocyanate | 13 parts | 13 parts | 13 parts | 13 parts |
| Cyclohexanone | 130 parts | 130 parts | 130 parts | 130 parts |
| Toluene | 70 parts | 70 parts | 70 parts | 70 parts |
| Lecithin | 3 parts | 3 parts | 3 parts | 3 parts |

| | Example 9 | Example 10 | Example 11 | Comparative Example 1 |
|---|---|---|---|---|
| Co-containing magnetic iron oxide | 100 parts | 100 parts | 100 parts | 100 parts |
| Vinyl chloride-vinyl acetate copolymer (VAGH of U.C.C. Co.) | 13 parts | 13 parts | 13 parts | 13 parts |
| Polyurethane (Esthane 5701 produced by Goodrich Co.) | 7 parts | 7 parts | 7 parts | 7 parts |
| Alumina powder | 5 parts | 5 parts | 5 parts | 5 parts |

TABLE 1-continued

| | | | | |
|---|---|---|---|---|
| Myristic acid | 1 part | | 1 part | 1 part |
| Butyl stearate | 1 part | | 1 part | 1 part |
| Carbon black | XC-72 (Cabot) 5 parts (BET 254 m²/g, oil absorption 178 ml/100 g) Raven-2000 (Columbian Carbon (BET 190 m²/g, oil absorption 65 ml/100 g) | Black Pearls-1000 16 parts (BET 138 m²/g, oil absorption 55 ml/100 g) Vulcan-P 4 part (BET 140 m²/g, oil absorption 114 ml/100 g) | Black Pearls-1000 5 parts (BET 138 m²/g, oil absorption 55 ml/100 g) Vulcan-P 5 parts (BET 140 m²/g, oil absorption 114 ml/100 g) | XC-72 (Cabot) 2 parts (BET 254 m²/g, oil absorption 178 ml/100 g) — 8 parts |
| Polyisocyanate | 13 parts | 13 parts | 13 parts | 13 parts |
| Cyclohexanone | 130 parts | 130 parts | 130 parts | 130 parts |
| Toluene | 70 parts | 70 parts | 70 parts | 70 parts |
| Lecithin | 3 parts | 3 parts | 3 parts | 3 parts |

| | Comparative Example 2 | Comparative Example 3 | Comparative Example 4 |
|---|---|---|---|
| Co-containing magnetic iron oxide | 100 parts | 100 parts | 100 parts |
| Vinyl chloride-vinyl acetate copolymer (VAGH of U.C.C. Co.) | 13 parts | 13 parts | 13 parts |
| Polyurethane (Esthane 5701 produced by Goodrich Co.) | 7 parts | 7 parts | 7 parts |
| Alumina powder | 5 parts | 5 parts | 5 parts |
| Myristic acid | 1 part | 1 part | 1 part |
| Butyl stearate | 1 part | 1 part | 1 part |
| Carbon black | Sterling NS 5 parts (BET 125 m²/g, oil absorption 71 ml/100 g) #5B (Mitsubishi Kasei) 5 part (BET 25 m²/g, oil absorption 69 ml/100 g) | Conductex-40-220 (Columbian Carbon)(BET 1066 m²/g, oil absorption 260 ml/100 g) 5 parts HS-500 (Asahi Carbon) 5 part (BET 37 m²/g, oil absorption 447 ml/100 g) | Raven-1255 5 parts (BET 140 m²/g, oil absorption 56 ml/100 g) — 8 parts |
| Polyisocyanate | 13 parts | 13 parts | 13 parts |
| Cyclohexanone | 130 parts | 130 parts | 130 parts |
| Toluene | 70 parts | 70 parts | 70 parts |
| Lecithin | 3 parts | 3 parts | 3 parts |

TABLE 2

|  | RF output (dB) | Lumi S/N (dB) | Chroma S/N (dB) | Surface resistivity ($\Omega$/sq) | Drop-out (5 $\mu$sec) | Coefficient of kinetic friction | Runnability test | Rectangular ratio (measured by VSM) |
| --- | --- | --- | --- | --- | --- | --- | --- | --- |
| Example 1 | +1.6 | +1.2 | +1.5 | $1 \times 10^9$ | 5 | 0.20 | OK | 0.80 |
| Example 2 | +0.8 | +0.9 | +0.1 | $8 \times 10^8$ | 6 | 0.22 | OK | 0.76 |
| Example 3 | +1.5 | +1.3 | +1.4 | $6 \times 10^8$ | 8 | 0.20 | OK | 0.78 |
| Example 4 | +0.7 | +0.6 | +1.1 | $2 \times 10^9$ | 4 | 0.18 | OK | 0.79 |
| Example 5 | +0.8 | +0.9 | +0.8 | $3 \times 10^9$ | 9 | 0.21 | OK | 0.80 |
| Example 6 | +0.8 | +0.8 | +0.9 | $2 \times 10^9$ | 5 | 0.19 | OK | 0.79 |
| Example 7 | +0.5 | +0.8 | +0.5 | $9 \times 10^7$ | 2 | 0.16 | OK | 0.77 |
| Example 8 | +1.6 | +1.4 | +1.7 | $9 \times 10^8$ | 4 | 0.19 | OK | 0.81 |
| Example 9 | 0 | 0 | 0 | $5 \times 10^8$ | 15 | 0.19 | OK | 0.74 |
| Comparative example 1 | −0.6 | −0.5 | −0.9 | $1 \times 10^8$ | 18 | 0.17 | OK | 0.75 |
| Comparative example 2 | −0.1 | +0.1 | −0.4 | $2 \times 10^{10}$ | 11 | 0.19 | NG | 0.74 |
| Comparative example 3 | −0.5 | −0.2 | −0.4 | $7 \times 10^8$ | 8 | 0.28 | NG | 0.73 |
| Example 10 | +0.1 | +0.2 | −0.1 | $5 \times 10^7$ | 6 | 0.17 | OK | 0.75 |
| Example 11 | +0.1 | −0.2 | −0.3 | $6 \times 10^8$ | 5 | 0.18 | OK | 0.76 |
| Comparative example 4 | +1.0 | +1.2 | +0.8 | $3 \times 10^{10}$ | 13 | 0.30 | NG | 0.80 |

From the results it is understood that Examples 1 through 11, particularly Examples 1 through 8, in which the two types of carbon black are used in combination according to this invention, are excellent in the following points as compared to the comparative examples.

(1) High-level electromagnetic conversion properties can be obtained.

(2) Surface resistivities of not more than $1 \times 10^{10} \Omega$/sq can be obtained. Consequently, dust hardly attaches to the surface, and drop-out defects are reduced.

(3) The coefficient of friction on the surface of the magnetic layer is lowered. As a result, a recording medium excellent in the running durability can be obtained.

(4) The use of the above types of carbon black improves the dispersing stability of a magnetic coating liquid to hardly form agglomerates, thus enabling to reduced the formation of drop-out defects.

Figure 4:
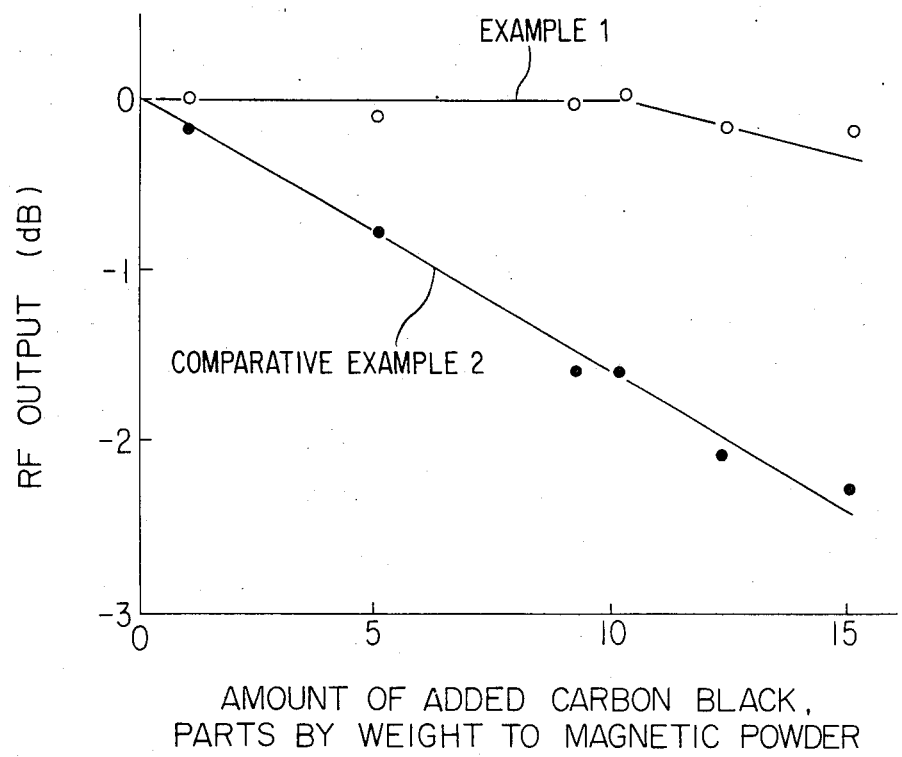
FIG. 4 is a graph showing changes in the RF output according to the adding amount of carbon black.

Also, aside from the above samples, different samples, wherein the total amount of the types of carbon black in the above Example 1 or Comparative Example 2 was varied, were prepared, and they were measured with respect to their RF output values, and the relation between the varied amounts of the carbon black and the RF values was found, and the results are shown in FIG. 4 with the RF output value at the time when the amount of the carbon black is zero being regarded as 0 dB. As is apparent from FIG. 4, the example for this invention is conspicuously smaller in the fall of the RF output than the comparative example.

Figure 5:
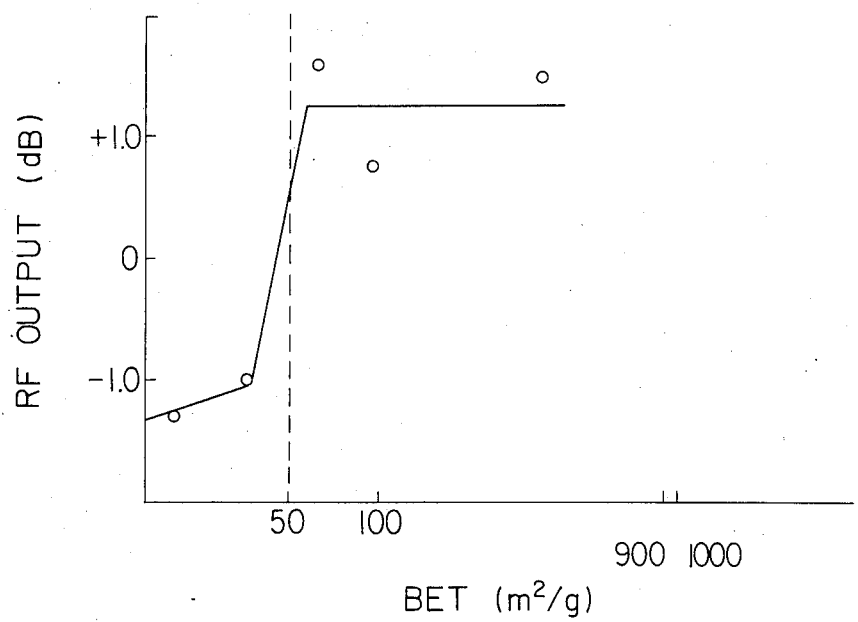
FIGS. 5, 6, 7 and 8 are graphs showing the respective characteristics of carbon black when its physical quantity is varied.
Figure 6:
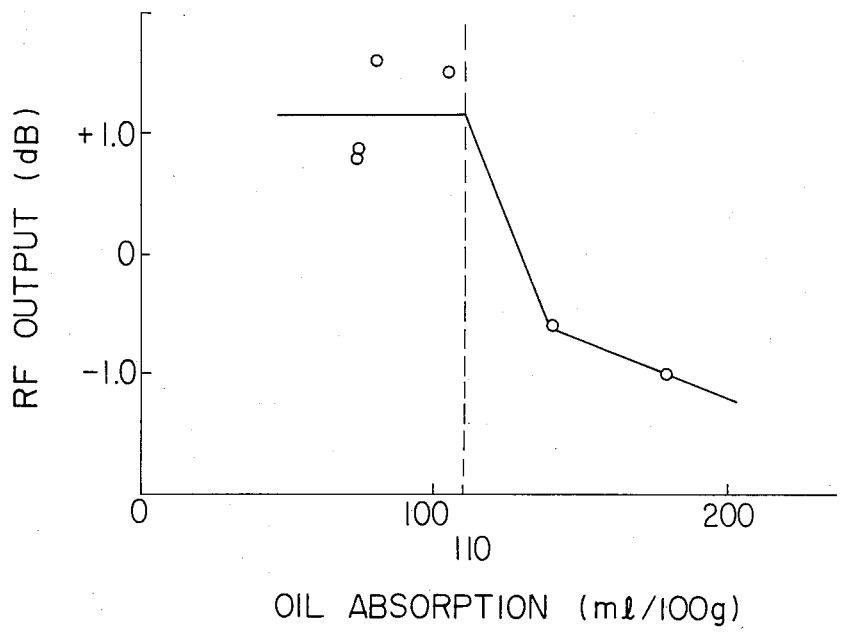
Figure 7:
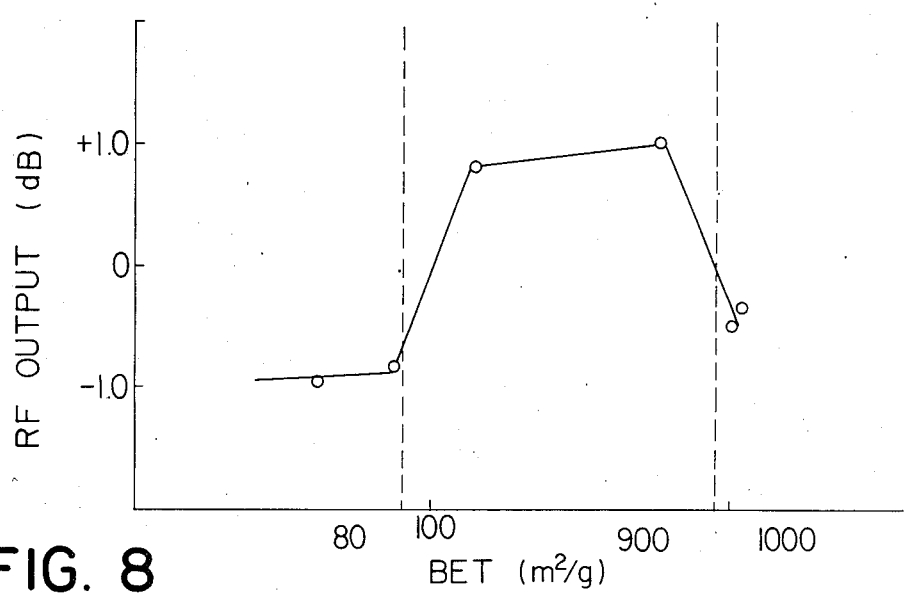

Subsequently, as given in Table 3, various further carbon blacks were used to prepare samples in Example 12 and Comparative Examples 5 through 16, and the obtained mediums were measured with respect to their characteristics with relation to the physical quantities of the carbon blacks. The results are shown in FIG. 5 through FIG. 8. The RF values in FIGS. 5 through 7 are shown in relative values to the RF output value of Example 1 regarded as 0 dB.

FIG. 5: Shows the relation between the BET value and the BF output of the second carbon black when the first carbon black (Vulcan-P) was fixed. (According to data of Examples 1, 2 and 3 and Comparative Examples 13 and 14.)

FIG. 6: Shows the relation between the DBP oil absorption and the RF output of the second carbon black when the first carbon black (Vulcan-P) was fixed. (According to data of Examples 1, 2, 3 and 5 and Comparative Examples 11 and 12.)

FIG. 7: Shows the relation between the BET value and the RF output of the first carbon black when the second carbon black (Raven-1035) was fixed. (According to data of Examples 2 and 12 and Comparative Examples 5, 6, 7 and 8.)

Figure 8:
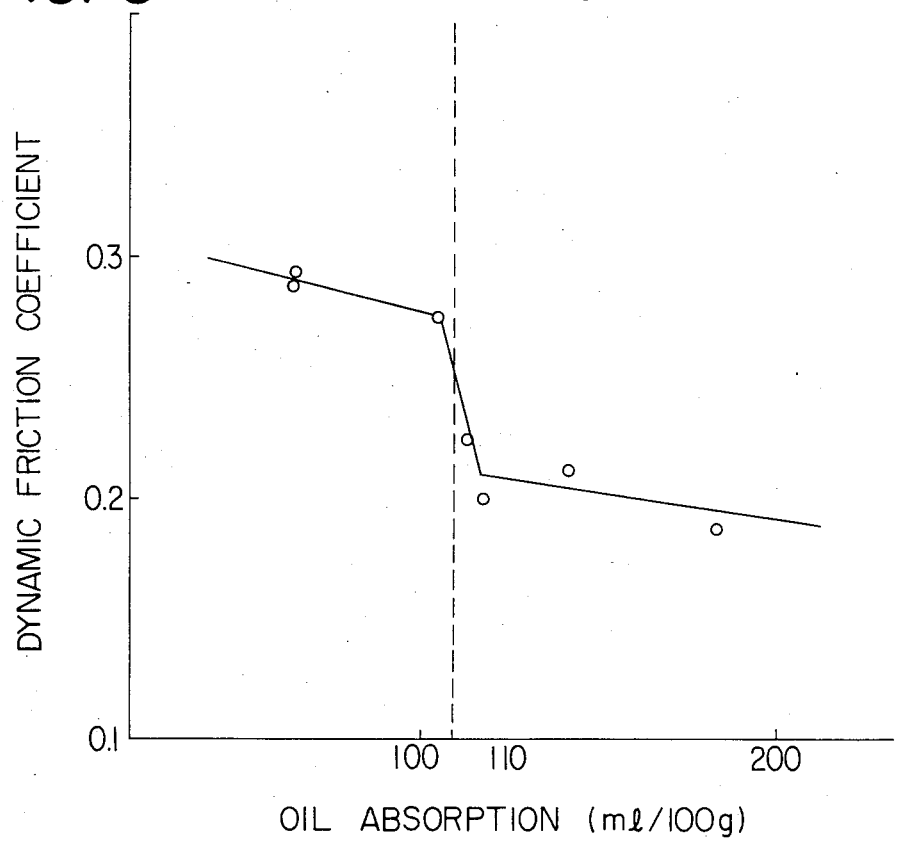

FIG. 8: Shows the relation between the DBP oil absorption and the coefficient of kinetic friction of the first carbon black when the second carbon black (Raven-1035) was fixed. (According to data of Example 2 and Comparative Examples 5, 6, 9, 10, 15 and 16.)

TABLE 3

| | Example 12 | Comparative Example 5 | Comparative Example 6 | Comparative Example 7 | Comparative Example 8 |
|---|---|---|---|---|---|
| Co-containing magnetic iron oxide | 100 parts | 100 parts | 100 parts | 100 parts | 100 parts |
| VAGH (U.C.C. Co.) | 13 parts | 13 parts | 13 parts | 13 parts | 13 parts |
| Esthane 5701 produced by Goodrich Co. | 7 parts | 7 parts | 7 parts | 7 parts | 7 parts |
| Alumina powder | 5 parts | 5 parts | 5 parts | 5 parts | 5 parts |
| Myristic acid | 1 part | 1 part | 1 part | 1 part | 1 part |
| Butyl stearate | 1 part | 1 part | 1 part | 1 part | 1 part |
| Carbon black: | Raven 1035 (BET 95 m²/g, oil absorption 56 ml/100 g) 6 parts | Raven 1035 (BET 95 m²/g, oil absorption 56 ml/100 g) 6 parts | Raven 1035 (BET 95 m²/g, oil absorption 56 ml/100 g) 6 parts | Raven 1035 (BET 95 m²/g, oil absorption 56 ml/100 g) 6 parts | Raven 1035 (BET 95 m²/g, oil absorption 56 ml/100 g) 6 parts |
| | Monarck 1300 (Cabot) (BET 560 m²/g, oil absorption 121 ml/100 g) 4 parts | Sterling SO (BET 42 m²/g, oil absorption 120 ml/100 g) 4 parts | Asahi Carbon #60H (BET 175 m²/g, oil absorption 148 ml/100 g) 4 parts | Ketjen Black 7EC (BET 1000 m²/g, oil absorption 121 ml/100 g) 4 parts | Conductex-40-220 (BET 1070 m²/g, oil absorption 260 ml/100 g) 4 parts |
| Polyisocyanate | 13 parts | 13 parts | 13 parts | 13 parts | 13 parts |
| Cyclohexanone | 130 parts | 130 parts | 130 parts | 130 parts | 130 parts |
| Toluene | 70 parts | 70 parts | 70 parts | 70 parts | 70 parts |
| Lecithin | 3 parts | 3 parts | 3 parts | 3 parts | 3 parts |

| | Comparative Example 9 | Comparative Example 10 | Comparative Example 11 | Comparative Example 12 | Comparative Example 13 |
|---|---|---|---|---|---|
| Co-containing magnetic iron oxide | 100 parts | 100 parts | 100 parts | 100 parts | 100 parts |
| VAGH (U.C.C. Co.) | 13 parts | 13 parts | 13 parts | 13 parts | 13 parts |
| Esthane 5701 produced by Goodrich Co. | 7 parts | 7 parts | 7 parts | 7 parts | 7 parts |
| Alumina powder | 5 parts | 5 parts | 5 parts | 5 parts | 5 parts |
| Myristic acid | 1 part | 1 part | 1 part | 1 part | 1 part |
| Butyl stearate | 1 part | 1 part | 1 part | 1 part | 1 part |
| Carbon black: | Raven 1035 (BET 95 m²/g, oil absorption 56 ml/100 g) 6 parts | Raven 1035 (BET 95 m²/g, oil absorption 56 ml/100 g) 6 parts | Neospectra AG (BET 800 m²/g, oil absorption 140 ml/100 g) 6 parts | XC-72 (Cabot) (BET 254 m²/g, oil absorption 178 ml/100 g) 5 parts | Asahi Thermal (BET 20 m²/g, oil absorption 94 ml/100 g) 5 parts |
| | Black Pearls-L (Cabot) (BET 138 m²/g, oil absorption 55 ml/100 g) 4 parts | XC-72 (Cabot) (BET 254 m²/g, oil absorption 178 ml/100 g) 4 parts | Vulcan-P (Cabot) (BET 142 m²/g, oil absorption 118 ml/100 g) 4 parts | Vulcan-P (Cabot) (BET 142 m²/g, oil absorption 118 ml/100 g) 5 parts | Vulcan-P (Cabot) (BET 142 m²/g, oil absorption 118 ml/100 g) 5 parts |
| Polyisocyanate | 13 parts | 13 parts | 13 parts | 13 parts | 13 parts |
| Cyclohexanone | 130 parts | 130 parts | 130 parts | 130 parts | 130 parts |
| Toluene | 70 parts | 70 parts | 70 parts | 70 parts | 70 parts |
| Lecithin | 3 parts | 3 parts | 3 parts | 3 parts | 3 parts |

| | Comparative Example 14 | Comparative Example 15 | Comparative Example 16 |
|---|---|---|---|
| Co-containing magnetic iron oxide | 100 parts | 100 parts | 100 parts |

TABLE 3-continued

| | | | | |
|---|---|---|---|---|
| VAGH (U.C.C. Co.) | 13 parts | 13 parts | 13 parts | 13 parts |
| Esthane 5701 produced by Goodrich Co.) | 7 parts | 7 parts | 7 parts | 7 parts |
| Alumina powder | 5 parts | 5 parts | 5 parts | 5 parts |
| Myristic acid | 1 part | 1 part | 1 part | 1 part |
| Butyl stearate | 1 part | 1 part | 1 part | 1 part |
| Carbon black | #55 (Mitsubishi Kasei) (BET 35 m$^2$/g, oil absorption 80 ml/100 g) 5 parts | Raven 1035 (BET 95 m$^2$/g, oil absorption 56 ml/100 g) 5 parts | Raven 1035 (BET 95 m$^2$/g, oil absorption 56 ml/100 g) 6 parts | Raven 1035 (BET 95 m$^2$/g, oil absorption 56 ml/100 g) 6 parts |
| | Vulcan-P (Cabot) (BET 142 m$^2$/g, oil absorption 118 ml/100 g) 5 parts | Black Pearls 1000 (BET 183 m$^2$/g, oil absorption 55 ml/100 g) 5 parts | Raven 1255 (BET 125 m$^2$/g, oil absorption 56 ml/100 g) 4 parts | Raven 1255 (BET 125 m$^2$/g, oil absorption 56 ml/100 g) 4 parts |
| Polyisocyanate | 13 parts | 13 parts | 13 parts | 13 parts |
| Cyclohexanone | 130 parts | 130 parts | 130 parts | 130 parts |
| Toluene | 70 parts | 70 parts | 70 parts | 70 parts |
| Lecithin | 3 parts | 3 parts | 3 parts | 3 parts |

As has been described above, in the first carbon black, a high RF output can be obtained only where the BET value thereof is from 80 m$^2$/g to 900 m$^2$/g, and the RF output can be improved when the oil absorption is made not less than 110 ml/100 g to remarkably lower the coefficient of friction, and further, in the second carbon black, the RF output can be improved where the BET value thereof is not less than 50 m$^2$/g and further improved when the oil absorption thereof is made less than 100 ml/100 g. Thus, it is understood that the superiority of restricting these characteristics to the specified ranges in this invention is remarkable.

What is claimed is:

1. A magnetic recording medium comprising a magnetic layer, said magnetic layer comprising
   a magnetic powdery material,
   a first carbon black having a specific surface in terms of a BET value of from 80 m$^2$/g to 900 m$^2$/g and an oil absorption in terms of DBP value of not less than 110ml/200 g, said first carbon black being present in a quantity of 0.1 to 10 parts by weight per 100 parts by weight of said magnetic powdery material, and
   a second carbon black having a specific surface in terms of BET value of not less than 50 m$^2$/g and an oil absorption in terms of DBP value of less than 110 ml/100 g, said second carbon black being present in a quantity of 3 to 15 parts by weight per 100 parts by weight of said magnetic powdery material.

2. The magnetic recording medium of claim 1, wherein said specific surface of said first carbon black is in terms of a BET value of from 80 m$^2$/g to 400 m$^2$/g.

3. The magnetic recording medium of claim 2, wherein said specific surface of said first carbon black is in terms of a BET value of from 80 m$^2$/g to 200 m$^2$/g.

4. The magnetic recording medium of claim 1, wherein said oil absorption of said first carbon black is in terms of a DBP value of from 110 ml/100 g to 200 ml/100 g.

5. The magnetic recording medium of claim 4, wherein said oil absorption of said first carbon black is in terms of a DBP value of from 110 ml/100 g to 160 ml/100 g.

6. The magnetic recording medium of claim 1, wherein said specific surface of said second carbon black is in terms of a BET value of from 50 m$^2$/g to 400 m$^2$/g.

7. The magnetic recording medium of claim 6, wherein said specific surface of said second carbon black is in terms of a BET value of from 50 m$^2$/g to 200 m$^2$/g.

8. The magnetic recording medium of claim 1, wherein said first carbon black and said second carbon black are added in a total amount there of 3.1 to 20 parts by weight to 100 parts by weight of said magnetic powdery material.

9. The magnetic recording medium of claim 8, wherein said total amount of said first carbon black and said second carbon black is 3.1 to 15 parts by weight to 100 parts by weight of said magnetic powdery material.

10. The magnetic recording medium of claim 1, wherein said first carbon black is present in an amount of 0.1 to 5 parts by weight to 100 parts by weight of said magnetic powdery material.

11. The magnetic recording medium of claim 1, wherein said second carbon black is present in an amount of 5 to 12 parts by weight to 100 parts by weight of said magnetic powdery material.

* * * * *